United States Patent
Moore

[11] 3,811,004
[45] May 14, 1974

[54] ELECTRICAL CORD HATCH
[76] Inventor: Glenn L. Moore, 2900-C Winding Waters Ln., Elkhart, Ind. 46514
[22] Filed: June 22, 1973
[21] Appl. No.: 372,592

[52] U.S. Cl.............. 174/67, 220/24.3, 220/31 S, 339/44 R
[51] Int. Cl............................................. H02g 3/14
[58] Field of Search........... 174/67; 220/24.3, 31 S; 339/36, 44 R; 16/140

[56] References Cited
UNITED STATES PATENTS

| 3,613,044 | 10/1971 | Rarick | 174/67 X |
|---|---|---|---|
| 3,773,969 | 11/1973 | Geisel | 174/67 |
| 2,987,214 | 6/1961 | Radack | 220/24.3 |
| 3,189,212 | 6/1965 | Bellek | 174/67 X |
| 3,252,611 | 5/1966 | Weitzman et al. | 174/67 X |

Primary Examiner—J. V. Truhe
Assistant Examiner—David A. Tone
Attorney, Agent, or Firm—Oltsch & Knoblock

[57] ABSTRACT

An improved hatch mountable to a side wall of a travel trailer or mobile home and used to accommodate an electrical power supply cord which is connected to an exterior power supply outlet. The hatch includes a housing having a cover which is shiftable between a closed position and an open position. The cover includes a slotted lower opening which serves to accommodate the electrical cord when the cover is in its closed position. A pivotally mounted tab is utilized to close the slotted opening in the cover and to secure the cover in its closed position when the electrical cord is disconnected from the power supply outlet.

6 Claims, 8 Drawing Figures 3,811,004

ELECTRICAL CORD HATCH

SUMMARY OF THE INVENTION

This invention relates to an improved electrical cord hatch which will find specific, but not limited, use in the travel trailer and mobile home construction arts.

A description of the general use of cord hatches can be found in U.S. Pat. No. 3,613,044. The hatch of this invention accommodates an electrical cord and includes a housing having a side wall and an end wall which cooperate to define a chamber having a front opening therein. The end wall has a cord-receiving opening therein. A cover is carried by the housing and has a slotted opening formed in its lower margin. The cover is pivotal between an open position which fully exposes the housing chamber and a closed position which spans and closes the housing front opening except at the slotted opening in the cover. A tab is shiftable over the lower margin of the cover and the slotted opening therein to secure the cover in its closed position and to close the slotted opening such as when the electrical cord passing through the hatch has been disconnected from an outside power source and retracted. The cover includes means which cooperate with the housing to releasably secure the cover in its open position. The cord-receiving opening in the housing end wall is designed so as to retain the plug of the electrical cord within easy reach in the housing chamber when the cord has been retracted and the cover of the hatch closed.

Accordingly, it is an object of this invention to provide an electrical cord hatch which is of economical construction and of reliable operation.

Another object of this invention is to provide an electrical cord hatch having a cover which is shiftable a full 180° between open and closed positions.

Another object of this invention is to provide an electrical cord hatch having a cover which includes parts engageable with the hatch housing for releasably securing the cover in a fully opened position.

Still another object of this invention is to provide an electrical cord hatch having means for retaining the plug portion of the cord within easy reach in the hatch when the cord is in a retracted position with the cover of the hatch closed.

Other objects of this invention will become apparent upon a reading of the invention's description.

BRIEF DESCRIPTION OF THE DRAWINGS

A preferred embodiment of this invention has been chosen for purposes of illustration and description wherein.

DESCRIPTION OF THE PREFERRED EMBODIMENT

Figure 1:
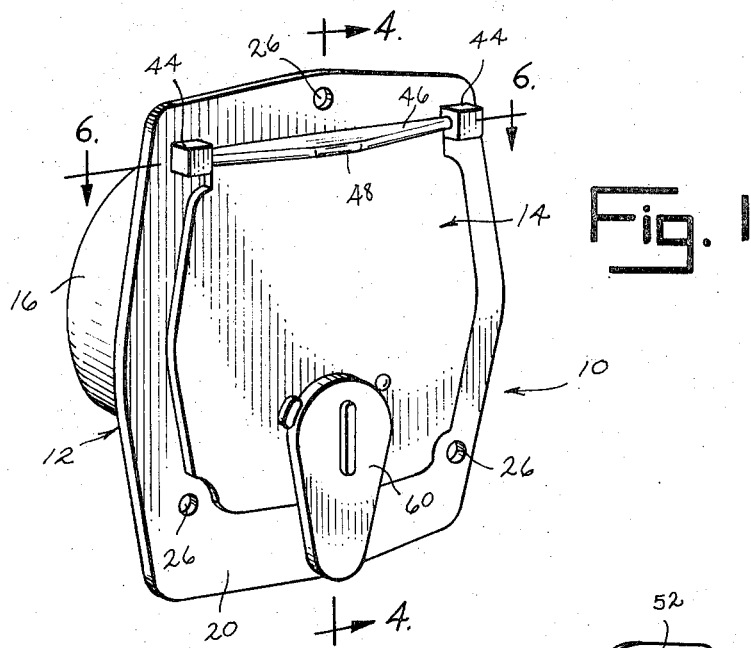
FIG. 1 is a front perspective view of the hatch shown with its cover in a closed locked position.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

The illustrated embodiment of the hatch, designated by the reference numeral 10, includes a housing 12 to which is mounted a cover 14. Housing 12 includes a side wall 16, an end wall 18, and an outer flange or face 20 which cooperate to define a chamber 22. Chamber 22 has a front opening 24 which is located oppositely of housing end wall 18. Face 20 includes openings 26 through which nails or screws may be driven or inserted when attaching hatch 10 to a travel trailer or mobile home outside wall with housing side wall 16 extending through an accommodating opening in such outside wall.

Figure 3:
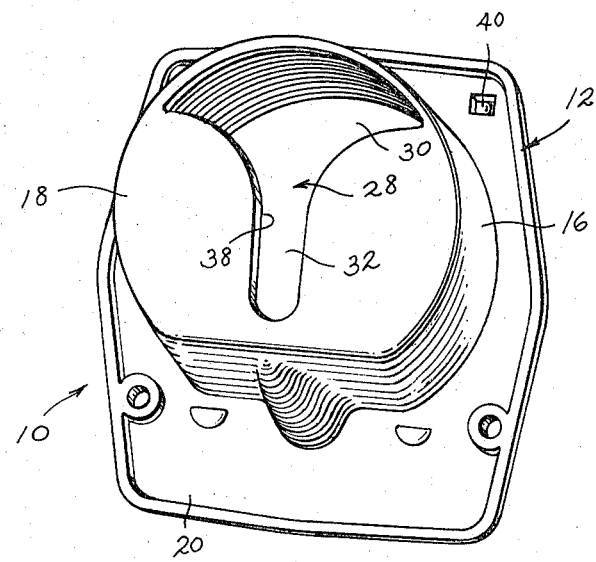
FIG. 3 is a perspective view of the hatch of FIG. 1 as seen from the rear.
Figure 4:
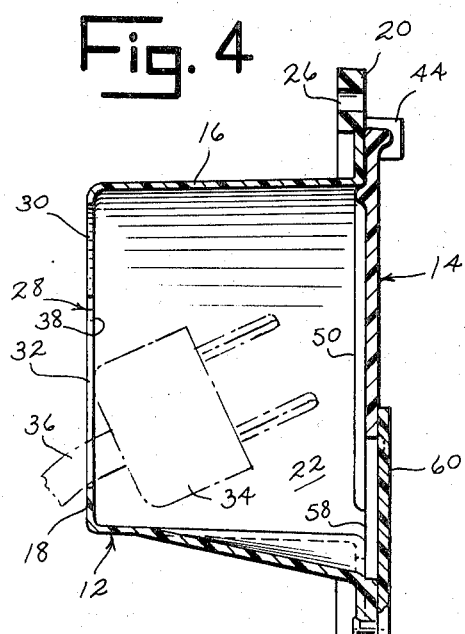
FIG. 4 is a sectional view taken along line 4—4 of FIG. 1.
Figure 5:
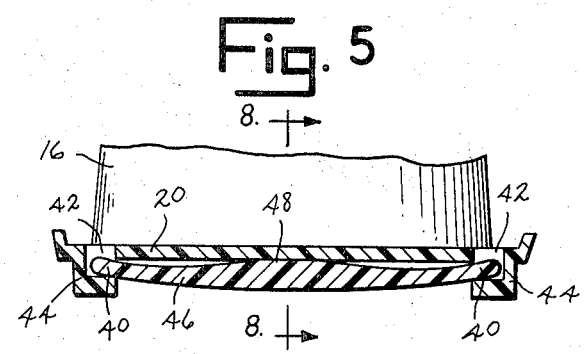
FIG. 5 is a fragmentary sectional view taken along line 5—5 of FIG. 2.

As best seen in FIG. 3, end wall 18 of housing 12 has an opening 28 formed therein. Opening 28 includes an enlarged upper part 30 and a lower slotted, generally V-shaped part 32. Part 30 is large enough to accommodate the plug 34 (shown in broken lines in FIG. 4) of an electrical cord. Lower part 32 of opening 28 is sufficiently wide to accommodate the flexible insulated cable 36 of the electrical cord, but not plug 34 thereof. Thus opening 28 allows the plug 34 of the electrical cord to be inserted from the back of hatch 10 into chamber 22 through upper part 30 of the opening. Once plug 34 of the cord has been inserted through opening upper part 30, the cord is lowered so that cable 36 of the cord fits within opening lower part 32 with plug 34 abutting and being retained within chamber 22 by the inner face 38 of housing end wall 18. With plug 34 of the cord so retained within housing chamber 22, the user of hatch 10 upon opening cover 14 need only grasp plug 34 and pull the cord out from chamber 22 to connect the plug to a suitable electrical power outlet. When the electrical cord is not in use, cable 36 thereof is retracted and stored between the outer and inner side walls of the travel or mobile home to which hatch 10 is connected with plug 34 being retained within the housing chamber as illustrated in FIG. 4.

Figure 8:
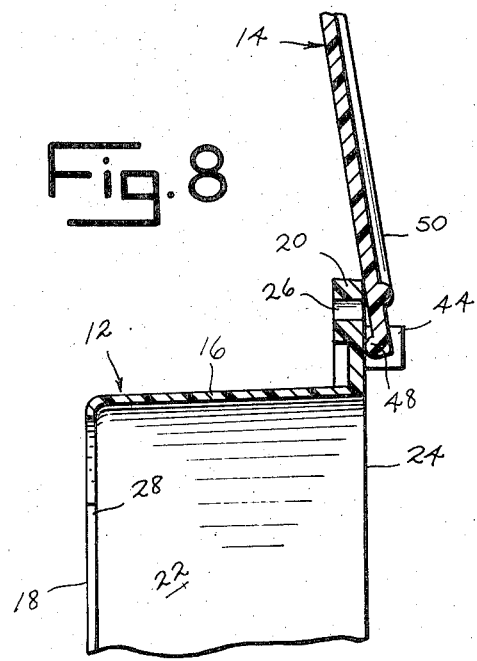
FIG. 8 is a fragmentary sectional view taken along line 8—8 of FIG. 5.

Cover 14 of hatch 10 includes oppositely extending coaxial pintles 40 which are located at the upper edge of the cover and which are pivotally secured within openings 42 of hinge parts 44. Hinge parts 44 form a part of housing 10 and extend outwardly from face 20 thereof adjacent the upper edge of opening 24 into the housing chamber. Cover 14 pivots at its pintles 40 between the closed position illustrated in FIG. 1 and the fully open position illustrated in FIG. 2, with the cover being swung through an arc of slightly more than 180°. The upper edge portion 46 of cover 14 which extends between pintles 40 includes an outwardly projecting rib 48 which upon rotation of the cover into its fully open position illustrated in FIG. 2 contacts face 20 of the housing and is cammed overcenter, as best illustrated in FIG. 8, to releasably secure the cover in its fully open position. Cover 14 as well as housing 12, which may be formed of a molded plastic material, has sufficient flexibility to accommodate the overcenter camming movement of rib 48 over housing face 20 as the cover is swung between its fully open and closed positions.

Figure 6:
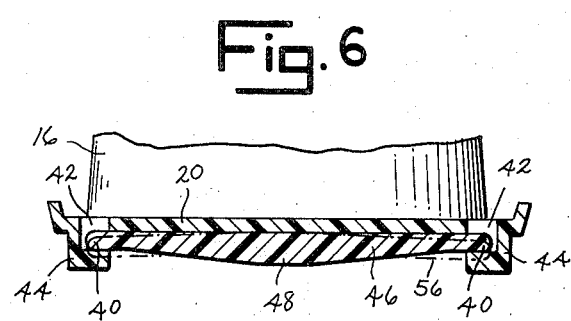
FIG. 6 is a fragmentary sectional view taken along line 6—6 of FIG. 1.

The inner face of cover 14 includes a part-circular rib 50 and laterally spaced lugs 52. Rib 50 fits within opening 24 into chamber 22 and lugs 52 fit within openings 54 formed in face 20 of the housing when the cover is in its closed position so as to center the cover and assist in providing an accommodating fit of the cover over chamber opening 24. Cover 14 is preferably formed with a slight outward bow along upper edge portion 46 and pintles 40, as shown by broken line 56 in FIG. 6, so that the cover, when attached to housing 12 and closed, will be slightly outwardly flexed in the center to assure a snug fit about opening 24 of the housing and to offset any set or other deformation which could occur after the cover has been placed in its fully open position with rib 48 thereof being cammed into contact with face 20 of the housing.

Figure 2:
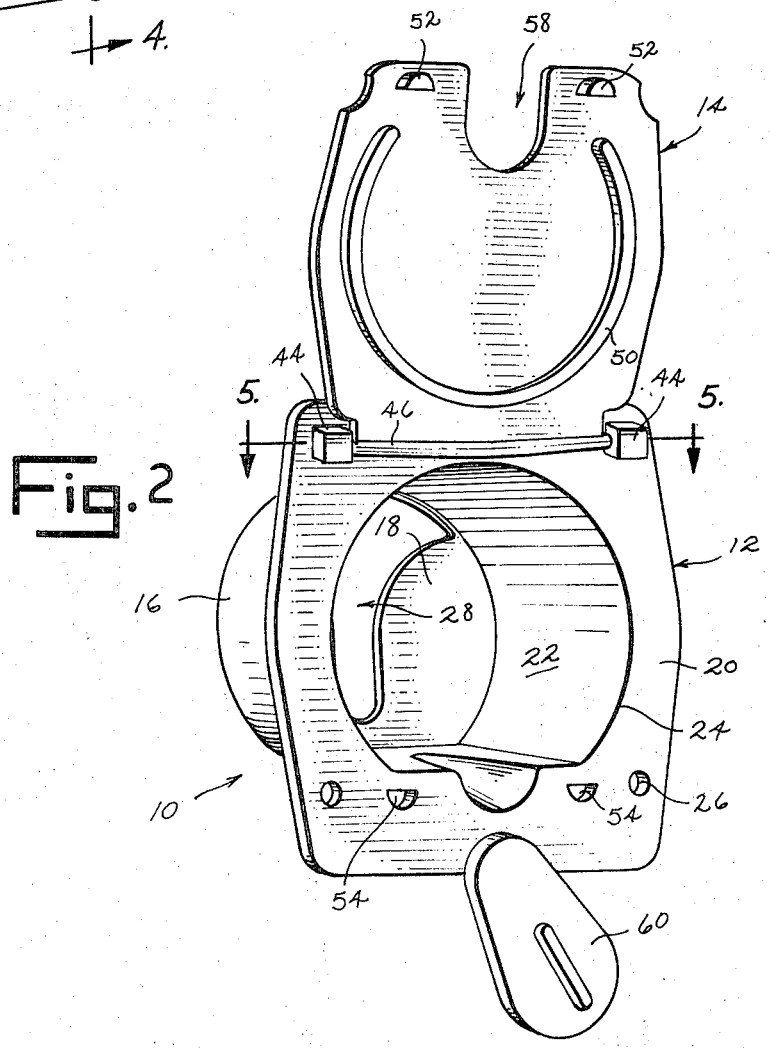
FIG. 2 is a perspective view of the hatch shown with its cover in a fully open position.
Figure 7:
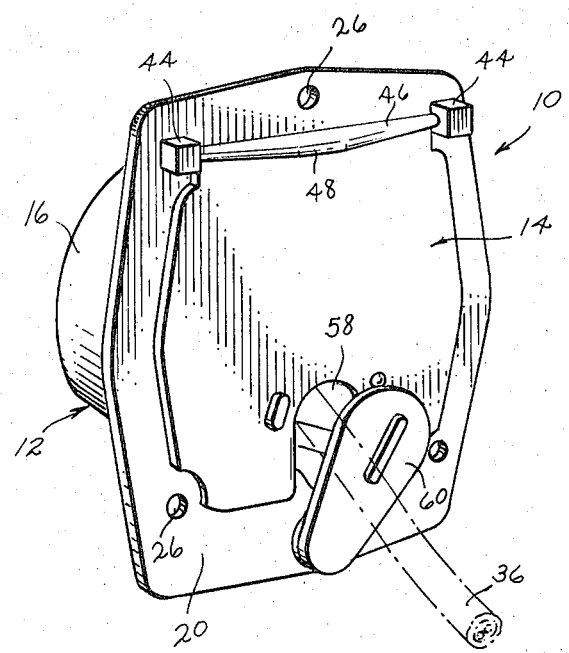
FIG. 7 is a perspective view in fragmentary form of the hatch shown with its cover in a closed position but with the slotted lower opening therein exposed to accommodate the flexible cable portion of an electrical cord.

Cover 14 has a slotted opening 58 formed in its lower margin. Slotted opening 58 is utilized to accommodate cable 36 of the electrical cord when the cord is connected to an exterior power source and cover 14 is closed. A tab 60 is pivotally connected to face 20 of housing 12 adjacent the lower margin of cover 14. Tab 60 is utilized as a covering means for slotted opening 58 in cover 14 as well as a securement means for the cover. In FIG. 1, tab 60 is shown in one of its operative positions covering slotted opening 58 and overlapping cover 14 at its lower margin so as to secure the cover closed and to cover the slotted opening. In FIG. 2, tab 60 is shown in another of its operative positions free from cover 14 which allows the cover to be shifted into its open position to fully expose the interior of chamber 22 of the housing. In FIG. 7, tab 60 is shown in still another operative position overlapping the lower margin of cover 14 so as to secure the cover in its closed position, with slotted opening 58 in the cover being exposed to allow cord cable 36 to extend through the slotted opening when the cord plug is connected to an exterior power source.

It is to be understood that the invention is not to be limited to the details above given, but may be modified within the scope of the appended claims.

What I claim is:

1. In an electrical cord hatch including a housing having a side wall and an end wall, said side wall and end wall defining a chamber in said housing, said end wall having a cord receiving opening therein, a front opening into said chamber located in said housing oppositely of said end wall, a cover carried by said housing and having a slotted opening formed in its lower margin, means pivotally connecting said cover to said housing wherein said cover is shiftable between an open position fully exposing said chamber through said front opening and a closed position spanning and closing said front opening except at said slotted opening, door means shiftable over said slotted opening when said cover is in its closed position to close said slotted opening, the improvement wherein said cover pivot connection means includes aligned oppositely extending spaced hinge pintles carried at the upper edge of said cover, said cover including an upper edge portion extending between said pintles, said housing including an outer face forming a part of said side wall and defining said front opening into said chamber, a pair of hinge parts carried by said housing and protruding outwardly from said housing outer face near the upper edge of and located at opposite sides of said front opening, said pintles fitting pivotally within said hinge parts with said cover upper edge portion located between said hinge parts, said cover edge portion including securement means for contacting the outer face of said housing to releasably secure said cover in its open position.

2. The electrical cord hatch of claim 1 wherein said cover is swung at least 180° when shifted between its open and closed positions.

3. The electrical cord hatch of claim 1 wherein said securement means constitutes protruding rib means, said pintles having a common axis, said rib means projecting laterally to one side of said axis and contacting said housing outer face to form an overcenter lock when said cover is shifted into its open position.

4. The electrical cord hatch of claim 3 wherein said rib means causes said cover to be flexed against and in sealing contact with said housing outer face about said front opening when said cover is in its closed position.

5. The electrical cord hatch of claim 1 wherein said cord receiving opening in said housing end wall includes an upper opening part large enough to accommodate the plug of a cord and a generally V-shaped narrow opening part below said upper opening part large enough to accommodate only the insulated cable of said cord whereby said cord cable will fit in said narrow opening part with said plug located in said chamber abutting said end wall about said narrow opening part when said cover is in its closed position.

6. In an electrical cord hatch including a housing having a side wall and an end wall, said side wall and end wall defining a chamber in said housing, said end wall having a cord receiving opening therein, a front opening into said chamber located in said housing oppositely of said end wall, a cover carried by said housing and having a slotted opening formed in its lower margin, means pivotally connecting said cover to said housing wherein said cover is shiftable between an open position fully exposing said chamber through said front opening and a closed position spanning and closing said front opening except at said slotted opening, tab means shiftable over said slotted opening when said cover is in its closed position to close said slotted opening, the improvement wherein said cover pivot connection means includes aligned oppositely extending spaced hinge pintles carried at the upper edge of said cover, said cover including an upper edge portion extending between said pintles, said housing including an outer face forming a part of said side wall and defining said front opening into said chamber, a pair of hinge parts carried by said housing and protruding outwardly from said housing outer face near the upper edge of and located at opposite sides of said front opening, said pintles fitting pivotally within said hinge parts with said cover upper edge portion located between said hinge parts, means for releasably securing said cover in its open position, and means pivotally connecting said tab means to said housing outer face, said tab means being shiftable about its pivot connection between first, second and third positions, said tab means in its first position overlying said cover and slotted opening to secure said cover in its closed position and to close said slotted opening, said tab means in its second position overlying said cover to secure said cover in its closed position with said slotted opening being exposed, and said tab means in its third position being shifted free of said cover to allow said cover to be swung into its open position.

* * * * *